United States Patent
Crowe et al.

(10) Patent No.: US 9,689,147 B2
(45) Date of Patent: Jun. 27, 2017

(54) SNAP IN MOUNTING SHANK FOR A FAUCET

(71) Applicant: Delta Faucet Company, Indianapolis, IN (US)

(72) Inventors: Darrell Scott Crowe, Lebanon, IN (US); Kurt Judson Thomas, Indianapolis, IN (US)

(73) Assignee: Delta Faucet Company, Indianapolis, IN (US)

( * ) Notice: Subject to any disclaimer, the term of this patent is extended or adjusted under 35 U.S.C. 154(b) by 0 days.

(21) Appl. No.: 14/797,805

(22) Filed: Jul. 13, 2015

(65) Prior Publication Data

US 2017/0016216 A1   Jan. 19, 2017

(51) Int. Cl.
*F15B 15/26* (2006.01)
*E03C 1/04* (2006.01)

(52) U.S. Cl.
CPC .... *E03C 1/0401* (2013.01); *E03C 2001/0415* (2013.01)

(58) Field of Classification Search
CPC ........................ E03C 1/0401; E03C 2001/0415
USPC ..... 137/801, 315.12, 359, 562; 285/321, 19, 285/131.1; 4/678, 676, 695; 248/212, 248/230.7, 224.8
See application file for complete search history.

(56) References Cited

U.S. PATENT DOCUMENTS

| | | | | |
|---|---|---|---|---|
| 2,461,354 A | * | 2/1949 | Stone | E03C 1/0403 220/241 |
| 2,468,315 A | * | 4/1949 | Wagner | E03C 1/0404 137/615 |
| 3,183,923 A | * | 5/1965 | Henrikson | E03C 1/102 137/216 |
| 3,467,476 A | * | 9/1969 | Fritz | B43K 23/126 285/321 |
| 4,136,982 A | * | 1/1979 | Sagady | F16B 21/18 403/108 |
| 4,161,191 A | | 7/1979 | Ranger et al. | |
| 4,683,523 A | * | 7/1987 | Olsson | F21V 31/00 362/158 |
| 4,711,595 A | * | 12/1987 | Magid | B25B 27/14 403/108 |
| 4,967,784 A | * | 11/1990 | Barhydt, Sr. | E03C 1/0401 137/216 |
| 4,998,555 A | * | 3/1991 | Barhydt, Sr. | E03C 1/0401 137/216 |
| 5,010,922 A | * | 4/1991 | Agresta | E03C 1/0401 137/216 |
| 5,127,438 A | * | 7/1992 | Williams | F16K 3/085 137/562 |
| 5,388,287 A | * | 2/1995 | Tischler | E03C 1/0401 137/359 |

(Continued)

*Primary Examiner* — Mary McManmon
*Assistant Examiner* — Minh Le
(74) *Attorney, Agent, or Firm* — Faegre Baker Daniels LLP

(57) ABSTRACT

A faucet mounting system includes an upper fixture including an outer wall defining a chamber, and at least one groove formed within an inner surface of the outer wall. A lower mounting shank extends below the upper fixture and includes a skirt, a post extending downwardly from the skirt, and at least one spring clip. The at least one spring clip is recessed within an outer surface of the skirt in a compressed position, and extending outside of the outer surface of the skirt in an extended position.

18 Claims, 7 Drawing Sheets

(56) References Cited

U.S. PATENT DOCUMENTS

| | | | | |
|---|---|---|---|---|
| 5,458,154 A * | 10/1995 | Niemann | ............... | E03C 1/0401 137/359 |
| 5,979,946 A * | 11/1999 | Petersen | ............... | F16L 37/088 285/143.1 |
| 6,070,614 A * | 6/2000 | Holzheimer | .......... | E03C 1/0401 137/359 |
| 6,079,447 A * | 6/2000 | Holzheimer | .......... | E03C 1/0401 137/801 |
| 6,220,278 B1 * | 4/2001 | Sauter | ................... | E03C 1/0401 137/315.12 |
| 6,301,728 B1 * | 10/2001 | Pilatowicz | ............ | E03C 1/0401 137/360 |
| 6,328,067 B1 | 12/2001 | Hsiung | | |
| 6,912,742 B1 * | 7/2005 | Wang | ................... | E03C 1/0401 4/678 |
| 7,393,019 B2 * | 7/2008 | Taga | ..................... | F16L 33/227 285/321 |
| 7,699,356 B2 * | 4/2010 | Bucher | ................. | F16L 37/088 285/244 |
| 8,185,984 B2 * | 5/2012 | Meehan | ............... | E03C 1/0401 137/801 |
| 8,220,492 B2 * | 7/2012 | Lin | ....................... | E03C 1/0401 137/315.12 |
| 8,408,240 B2 * | 4/2013 | Huang | .................... | E03C 1/042 137/360 |
| 8,424,559 B2 * | 4/2013 | Huang | .................... | F16K 1/12 137/359 |
| 8,584,697 B2 * | 11/2013 | Hsu | ....................... | F16K 19/006 137/315.12 |
| 8,899,259 B2 * | 12/2014 | Jonte | .................... | E03C 1/0402 137/315.12 |
| 8,925,571 B2 * | 1/2015 | Li | ......................... | E03C 1/0402 137/315.12 |
| 9,051,719 B2 * | 6/2015 | Li | ......................... | E03C 1/0402 |
| 9,206,791 B2 * | 12/2015 | Hawkins | .................. | F04B 7/00 |
| 2006/0157127 A1 | 7/2006 | Bors et al. | | |
| 2008/0277927 A1 | 11/2008 | Mueller et al. | | |
| 2009/0276954 A1 * | 11/2009 | Davidson | .............. | E03C 1/0401 4/695 |
| 2010/0175765 A1 | 7/2010 | Andersen et al. | | |
| 2012/0267493 A1 | 10/2012 | Meehan et al. | | |
| 2014/0116553 A1 * | 5/2014 | Schoolcraft | ............ | E03C 1/057 137/801 |

* cited by examiner

US 9,689,147 B2

SNAP IN MOUNTING SHANK FOR A FAUCET

BACKGROUND AND SUMMARY OF THE INVENTION

The present disclosure relates generally to faucets and, more particularly, to couplers for securing mounting shanks to faucet mounting hubs.

Conventional faucets are often mounted to a sink deck through downwardly extending threaded mounting shanks and cooperating mounting nuts. Conventional methods of assembling mounting shanks to above deck faucet fixtures often prove to be complicated and/or expensive. Additionally, conventional mounting shanks may provide limited space for the positioning and movement of water tubes and/or electrical wires associated with the faucet.

The present invention is configured to simplify the assembly process of attaching a mounting shank extending below a sink deck to a faucet fixture positioned above the sink deck. The present invention is also configured to increase the amount of open space within the inside cavity of the faucet fixture and provide additional room for faucet components, such as water tubes and/or electrical wires.

According to an illustrative embodiment of the present disclosure, a faucet mounting system includes an upper fixture having an outer wall with an upper end and a lower end. An inner surface defines a chamber extending between the upper end and the lower end. At least one groove is formed within the inner surface proximate the lower end. A lower mounting shank extends below the upper fixture. The lower mounting shank includes a skirt having a skirt wall, a post extending downwardly from the skirt, and at least one spring clip. The at least one spring clip is recessed radially within the outer surface of the skirt wall in a compressed position, and the at least one spring clip extends radially outside of the outer surface of the skirt wall in an extended position. The spring clip includes a pair of mounting members, and the skirt includes a fulcrum positioned intermediate the mounting members.

According to another illustrative embodiment of the present disclosure, a faucet mounting system includes an upper fixture having a cylindrical outer wall with an upper end and a lower end. An inner surface defines a chamber extending between the upper end and the lower end. At least one angular groove is formed within the inner surface proximate the lower end. An axially extending key is supported by the inner surface. A lower mounting shank extends below the upper fixture. The lower mounting shank includes a skirt having a skirt wall, a post extending downwardly from the skirt, at least one spring clip received within the at least one annular groove for axially securing the mounting shank to the upper fixture, and a keyway receiving the key for rotationally securing the mounting shank to the upper fixture.

According to a further illustrative embodiment of the present disclosure, a faucet mounting system includes an upper fixture having a cylindrical outer wall with an upper end and a lower end. An inner surface defines a chamber extending between the upper end and the lower end, and at least one angular groove is formed within the inner surface proximate the lower end. A lower mounting shank extends below the upper fixture. The lower mounting shank includes a skirt having a skirt wall, a post extending downwardly from the skirt, and at least one spring clip received within the at least one angular groove for axially securing the mounting shank to the upper fixture. The outer wall of the skirt defines a first longitudinal axis, and the post defines a second longitudinal axis, the first longitudinal axis being offset from the second longitudinal axis.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF DRAWINGS

The detailed description of the drawings particularly refers to the accompanying figures, in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
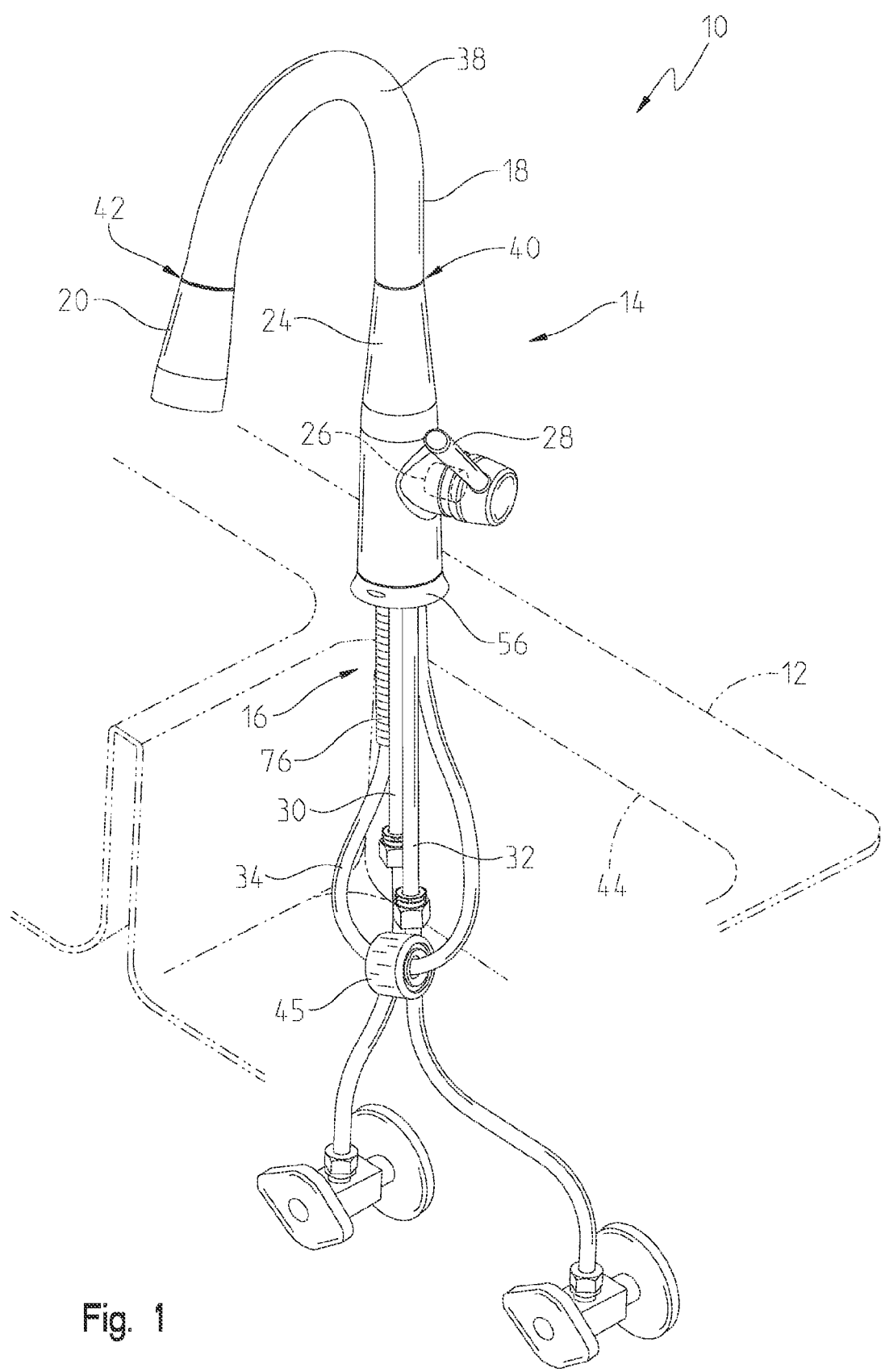
FIG. 1 is a perspective view of an illustrative faucet of the present disclosure mounted to a sink deck.
Figure 2:
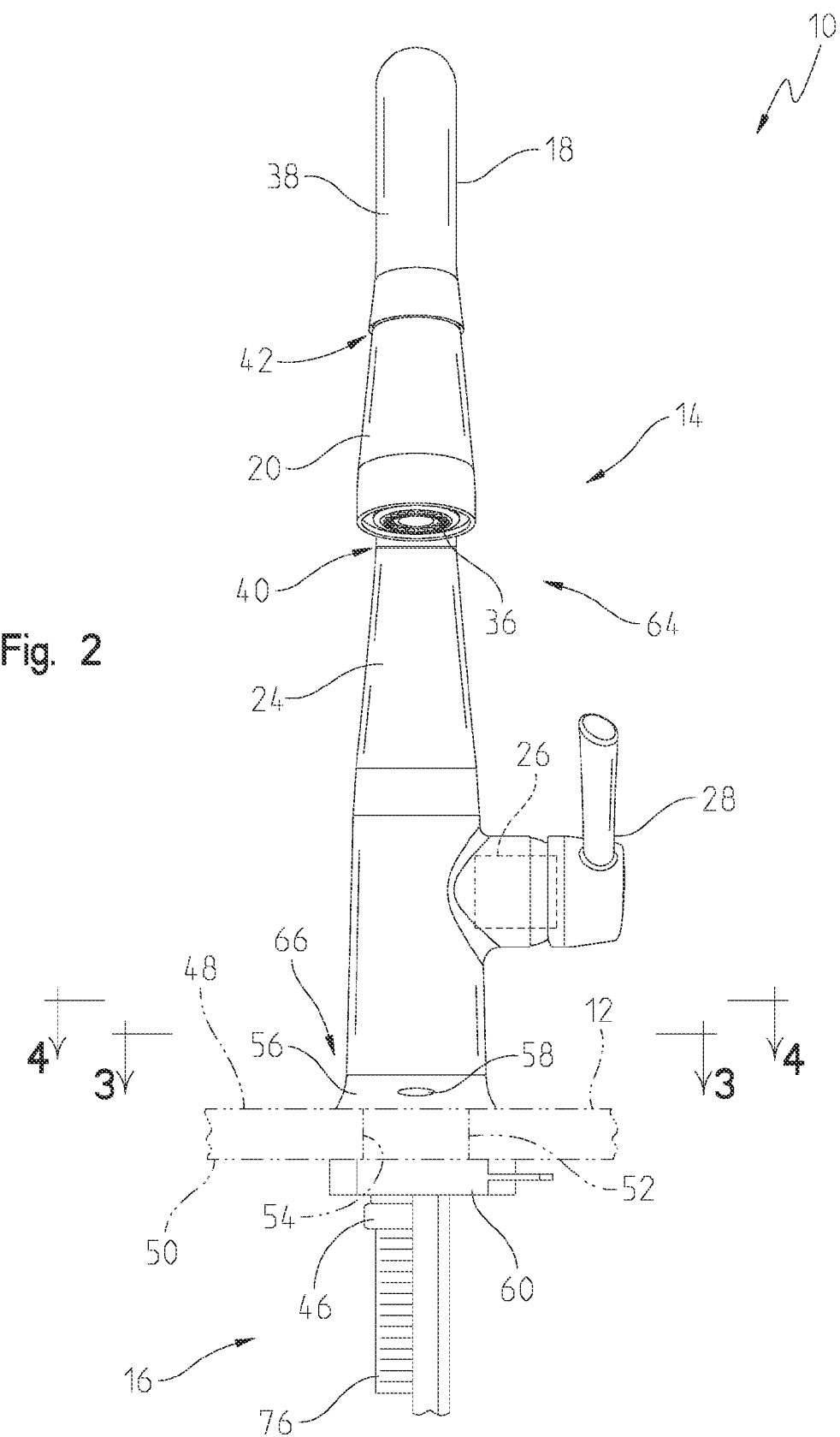
FIG. 2 is a front elevational view of the faucet of FIG. 1.

With reference initially to FIGS. 1 and 2, an illustrative faucet 10 according to the present disclosure is shown coupled to a sink deck 12. The faucet 10 illustratively includes an upper faucet fixture or assembly 14, and a lower mounting shank 16 extending downwardly from the upper faucet assembly 14. A faucet mounting system 17 secures the upper faucet assembly 14 to the lower mounting shank 16, and therefore the sink deck 12. The upper faucet assembly 14 illustratively includes a delivery spout 18 supporting a pull-down sprayhead 20.

In certain illustrative embodiments, the faucet 10 may be an electronic faucet. For example, at least a portion of the delivery spout 18 may be electrically conductive (e.g., formed of metal) and electrically coupled to the mounting shank 16 to provide for capacitive sensing. Moreover, the mounting shank 16 may be electrically coupled to a controller (not shown) to provide capacitive sensing functionality, wherein an electrically operable valve (not shown) may be controlled in response to a user, for example, touching an electrically conductive portion of the delivery spout 18.

A manual mixing valve 26 of conventional design is illustratively supported by the hub 24. A manual handle 28 controls the flow rate and temperature of water delivered to the sprayhead 20. More particularly, operation of the manual handle 28 controls the flow of water from hot and cold water supply tubes 30 and 32 through the mixing valve 26 to an outlet tube 34. The outlet tube 34 fluidly couples the mixing valve 26 to an outlet 36 defined by the sprayhead 20.

The delivery spout 18 illustratively includes an arcuate tube 38 having a first or lower end 40 supported by a hub 24 and a second or upper end 42 supporting the sprayhead 20. The sprayhead 20 may be uncoupled and removed from the second end 42 of the tube 38 for manipulation relative to a sink 44. A hose weight 45 is slidably received on the outlet tube 34 and is configured to retract the sprayhead 20 to its coupled position at the second end 42 of the tube 38.

With reference to FIG. 2, the lower mounting shank 16 is coupled to the hub 24 and cooperates with a mounting nut 46 to secure the faucet 10 to the sink deck 12. More particularly, the sink deck 12 includes an upper surface 48, a lower surface 50, and a sink deck aperture 52 that is defined by an internal wall 54 extending between the upper surface 48 and the lower surface 50 of the sink deck 12. A spout insulator or base ring 56 is positioned intermediate the lower end 40 of the delivery spout 18 and the upper surface 48 of the sink deck 12. The base ring 56 may house electronics, such as a light emitting device 58.

A mounting bracket 60 is configured to engage the lower surface 50 of the sink deck 12 below the sink deck aperture 52, such that the sink deck 52 is clamped between the delivery spout 18 and the mounting bracket 60. Additional details of an illustrative mounting bracket 60 are disclosed in US Patent Application Publication No. 2012/0267493 to Meehan et al., the disclosure of which is expressly incorporated herein by reference.

The hub 24 illustratively includes an outer wall 62 including an upper end 64 and a lower end 66. An inner surface 68 defines a chamber 70 extending between the upper end 64 and the lower end 66. The water tubes 30, 32, 34 coupled to the mixing valve 26 are received within the chamber 70. An angular groove 72 is formed within the inner surface 68 of the hub 24 proximate the lower end 66.

Figure 3:
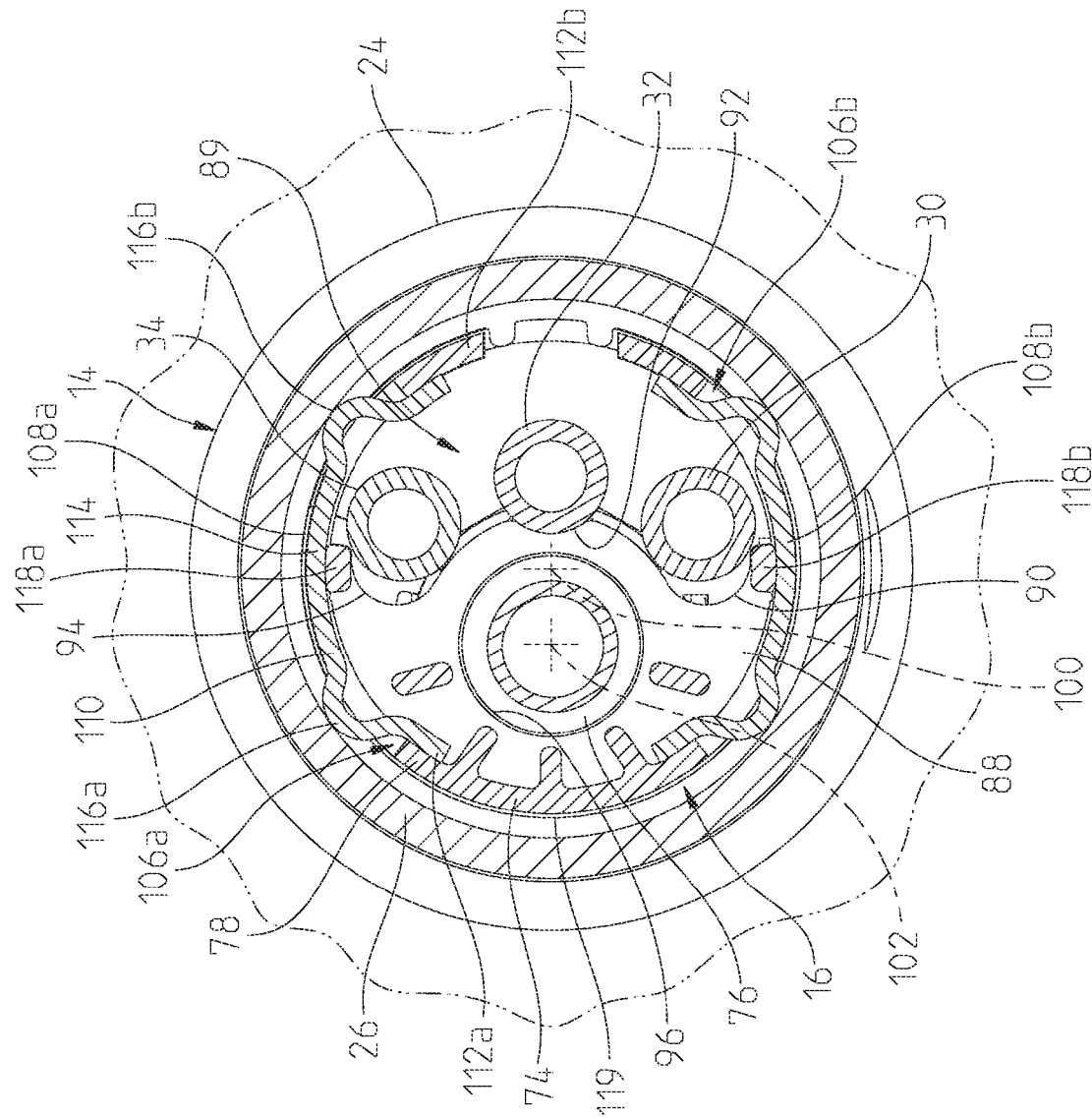
FIG. 3 is a cross-sectional view taken along line 3-3 of FIG. 2.
Figure 4:
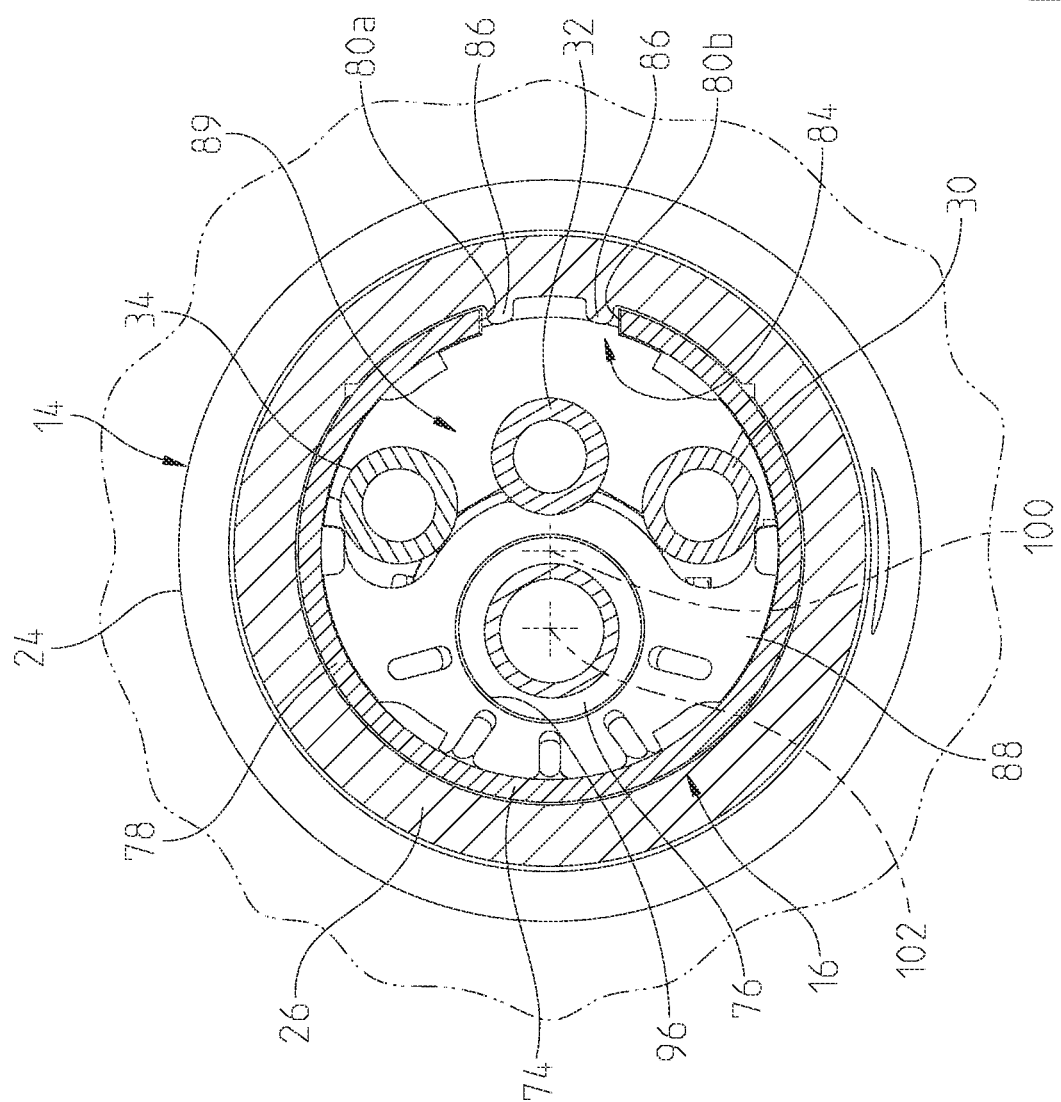
FIG. 4 is a cross-sectional view taken along line 4-4 of FIG. 2.
Figure 5:
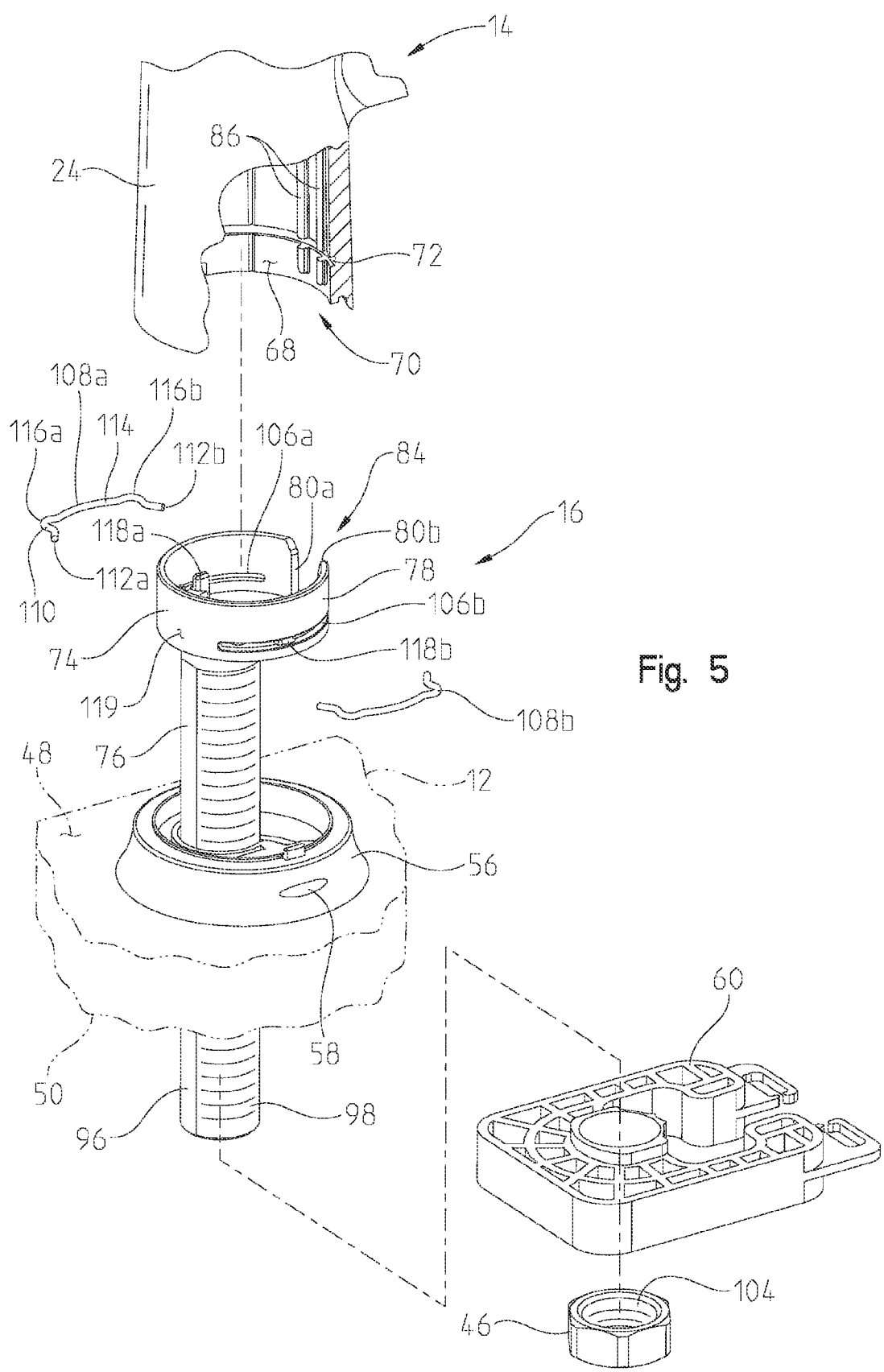
FIG. 5 is a partially exploded perspective view of the faucet of FIG. 1, with a partial cut away of the hub and the sink deck being shown in phantom.
Figure 6:
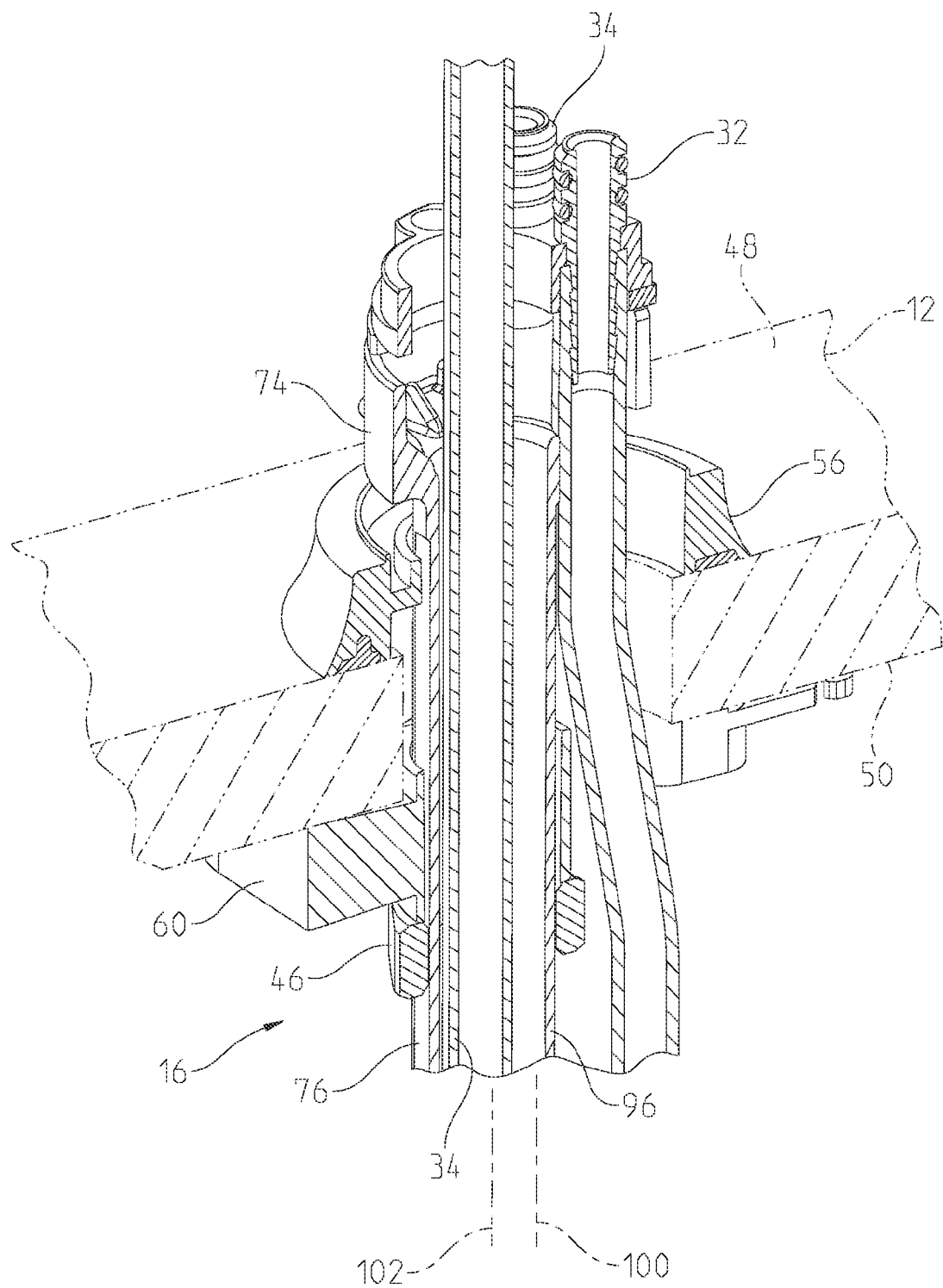
FIG. 6 is a partial cross-sectional view of the faucet of FIG. 1 mounted to the sink deck.

With reference to FIGS. 3-5, the lower mounting shank 16 is secured within the chamber 70 of the hub 24 and extends downwardly therefrom. The lower mounting shank 16 is illustratively formed of a metal, such as zinc, and includes a skirt 74 and a downwardly extending post 76. The skirt 74 illustratively includes an arcuate skirt or outer wall 78 having opposing side edges 80a, 80b defining a keyway 84. The keyway 84 is configured to cooperate with a key 86 extending radially inwardly from the inner surface 68 of the hub 24. More particularly, the key 86 is received within the keyway 84 to rotationally orient the hub 24, and therefore the delivery spout 18 of the upper faucet assembly 14, relative to the lower mounting shank 16.

A base 88 couples the outer wall 78 of the skirt 74 to the post 76. The base 88 includes an opening 89 to receive tubes 30, 32, 34 and electrical wires (not shown) extending from the upper faucet assembly 14 to below the sink deck 12. Arcuate edges 90, 92, 94 within the base 88 are configured to receive tubes 30, 32, 34, respectively.

The post 76 illustratively includes a cylindrical side wall 96 supporting external threads 98. The outer wall 78 of the skirt 74 defines a first longitudinal axis 100. The cylindrical side wall 96 of the post 76 defines a second longitudinal axis 102. The first longitudinal axis 100 is radially offset from the second longitudinal axis 102 to provide space for the water tubes 30, 32, 34 within the opening 89.

The mounting nut 46 illustratively engages with the mounting shank 16 to secure the upper faucet assembly 14 to the sink deck 12. For example, the mounting nut 46 includes internal threads 104 threadably engaging external threads 98 of the mounting shank post 76 to be firmly secured against an underside of the mounting bracket 60, thereby providing an upward force that urges the mounting bracket 60 against the lower surface 50 of the sink deck 12 and pulls delivery spout 18 against base ring tightly against upper surface 48 of sink deck 12.

With reference to FIGS. 3 and 5, diametrically opposed windows 106a, 106b are formed within the outer wall 78 of the skirt 74 and receive diametrically opposed first and second spring clips 108a, 108b. Each spring clip 108a, 108b includes a spring body 110, illustratively formed of stainless steel wire, having opposing ends 112a, 112b and a center portion 114. Opposing retaining members 116a, 116b are positioned intermediate the center portion 114 and the opposing ends 112a, 112b. The skirt 74 includes a pair of diametrically opposed fulcrums 118a, 118b supported by the base 88 and extending within the respective windows 106a, 106b. Each fulcrum 118a, 118b is positioned intermediate the retaining members 116a, 116b of associated spring clip 108a, 108b. More particularly, each fulcrum 118a, 118b engages the center portion 114 of respective spring clip 108a, 108b.

In a first or compressed position, the retaining members 116a, 116b of the spring clips 108a, 108b are recessed within an outer surface 119 of the outer wall 78 of the skirt 74. In a second or extended position, the retaining members 116a, 116b of the spring clips 108a, 108b extend outside of the outer surface 119 of the outer wall 78 of the skirt 74. In the compressed position, the retaining members 116a, 116b of the spring clips 108a, 108b allow for axial movement of the mounting shank 16. In the extended position, the retaining members 116a, 116b extend radially outwardly into the annular groove 72 of the hub 24 to prevent axial movement of the mounting shank 16 relative to the hub 24.

Figure 7:
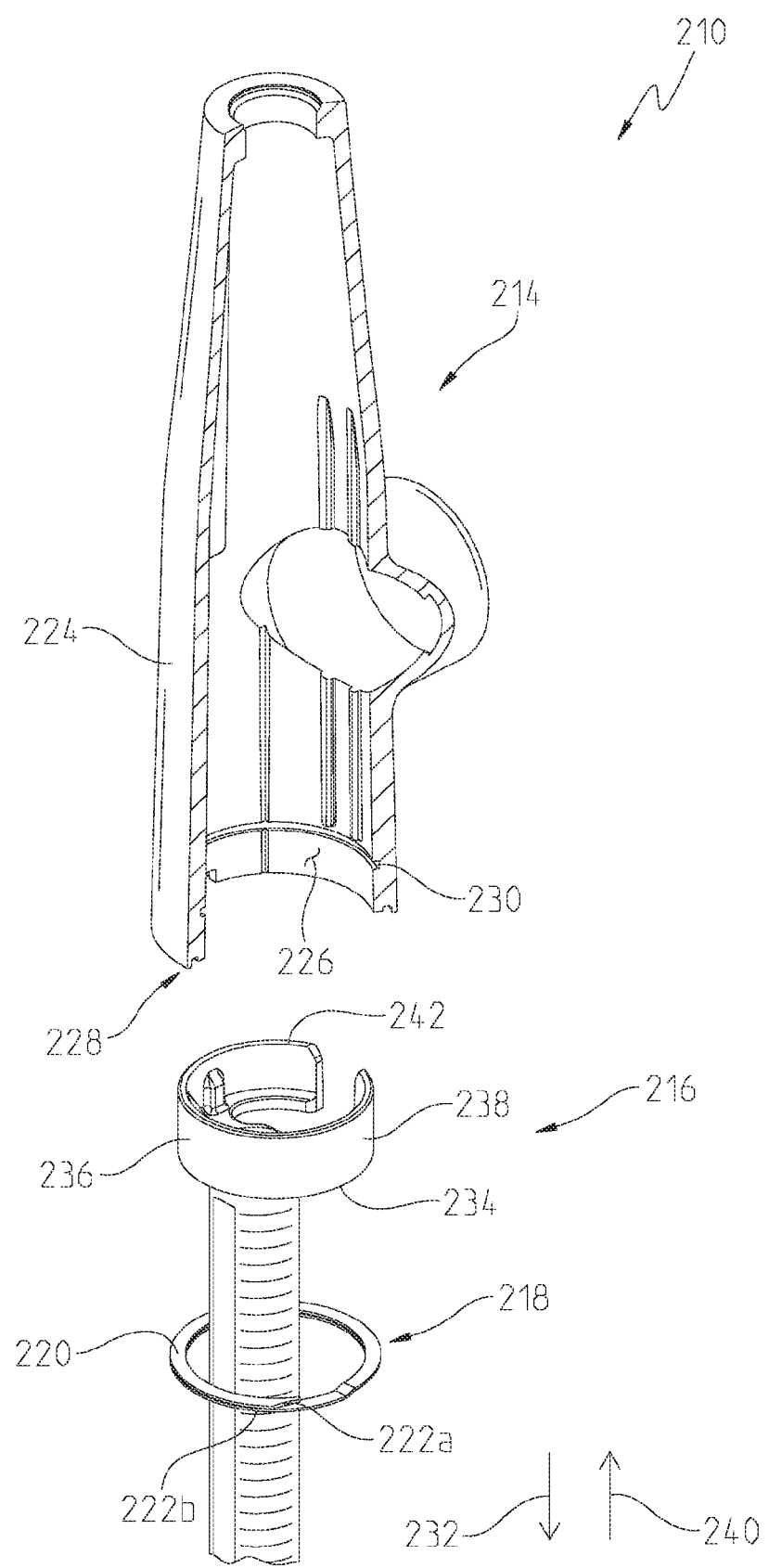
FIG. 7 is a partially exploded perspective view of a further illustrative embodiment faucet, with the hub shown in cross-section.

With reference to FIG. 7, a further illustrative faucet 210 is shown as including an upper faucet fixture or assembly 214, and a lower mounting shank 216 secured to and extending downwardly from the upper faucet assembly 214. Faucet 210 includes many similar features as faucet 10, wherein similar elements are identified with like reference numbers.

An annular spring or retaining clip 218 secures a mounting shank 216 to a mounting hub 224. More particularly, the illustrative retaining clip 218 includes a full or closed split ring 220 (i.e. extending 360 degrees in circumference). Opposing ends 222a, 222b of the ring 220 illustratively circumferentially overlap and may move relative to each other to define a compressed position and an extended position. In a compressed position, the ring 220 has a reduced outer diameter such that the clip 218 may move along inner surface 226 of the hub 224 from a lower end 228. In an extended position, the ring 220 has an increased outer diameter such that the clip 218 projects into an annular groove 230, thereby securing the mounting shank 216 to the mounting hub 224.

The retaining clip 218 prevents axial movement of the mounting shank 216 downwardly out of the hub 224 (in the direction of arrow 232 in FIG. 7) by engaging a lower edge 234 of the outer wall 236 of skirt 238. Reduced diameter of the inner surface 226 of the hub 224 above the groove 230 may prevent axial movement of the mounting shank 216 upwardly into the hub 224 (in the direction of arrow 240 in FIG. 7). In alternative illustrative embodiments, a projection, such as a shoulder or a lip, may engage an upper edge 242 of the outer wall 236 to prevent upward axial movement of the mounting shank 216. In operation, the retaining clip 218 defines a support surface upon which the mounting shank 216 acts for urging the upper faucet assembly 214 downwardly against the sink deck 12 as the mounting nut 46 is threaded onto the post 76.

Although the invention has been described in detail with reference to certain preferred embodiments, variations and modifications exist within the spirit and scope of the invention as described and defined in the following claims.

The invention claimed is:

1. A faucet mounting system comprising:
an upper fixture including an outer wall having an upper end and a lower end, an inner surface defining a chamber extending between the upper end and the lower end, and at least one groove formed within the inner surface proximate the lower end; and
a lower mounting shank extending below the upper fixture, the lower mounting shank including a skirt having a skirt wall, a post extending downwardly from the skirt, and at least one spring clip, the at least one spring clip recessed radially within the outer surface of the skirt wall in a compressed position, and the at least one spring clip extending radially outside of the outer surface of the skirt wall and received within the at least one groove for axially securing the lower mounting shank to the upper fixture in an extended position, wherein the at least one spring clip includes a pair of opposing retaining members, and the skirt includes a fulcrum positioned intermediate the pair of opposing retaining members, with the pair of opposing retaining members configured to move relative to opposing sides of the fulcrum.

2. The faucet mounting system of claim 1, further comprising a key supported by one of the upper fixture and the lower mounting shank, and a keyway supported by the other of the lower mounting shank and the upper fixture, the key received within the keyway to rotationally orient the upper fixture relative to the lower mounting shank.

3. The faucet mounting system of claim 1, wherein the upper fixture comprises a faucet spout hub.

4. The faucet mounting system of claim 1, wherein:
the outer wall of the upper fixture is cylindrical, and the at least one groove is arcuate; and
the at least one spring clip includes a pair of diametrically opposed spring clips.

5. The faucet mounting system of claim 4, wherein the pair of opposing retaining members are proximate ends of the spring clip.

6. The faucet mounting system of claim 4, wherein the skirt wall includes a slot to receive the retaining members of the spring clip.

7. The faucet mounting system of claim 1, wherein the post includes external threads to receive a mounting nut.

8. The faucet mounting system of claim 1, wherein the skirt includes a base coupling the outer wall to the post of the mounting shank, the outer wall of the skirt defining a first longitudinal axis and the post defining a second longitudinal axis, the first longitudinal axis being offset from the second longitudinal axis, and an opening formed within the base to receive tubes.

9. A faucet mounting system comprising:
an upper fixture including a cylindrical outer wall having an upper end and a lower end, an inner surface defining a chamber extending between the upper end and the lower end, at least one annular groove formed within the inner surface proximate the lower end, and an axially extending key supported by the inner surface; and
a lower mounting shank extending below the upper fixture, the lower mounting shank including a skirt having a skirt wall, a post extending downwardly from the skirt, a pair of diametrically opposed spring clips received within the at least one annular groove for axially securing the lower mounting shank to the upper fixture, wherein each of the pair of diametrically opposed spring clips includes a pair of opposing retaining members proximate ends thereof, the skirt includes a fulcrum positioned intermediate the retaining members, and the skirt wall includes a slot to receive the retaining members, and a keyway receiving the axially extending key for rotationally securing the mounting shank to the upper fixture.

10. The faucet mounting system of claim 9, wherein the at least one spring clip is recessed within the outer surface of the skirt wall in a compressed position, and the at least one spring clip extends outside of the outer surface of the skirt wall in an extended position.

11. The faucet mounting system of claim 9, wherein the upper fixture comprises a faucet spout hub.

12. The faucet mounting system of claim 9, wherein the post includes external threads to receive a mounting nut.

13. The faucet mounting system of claim 9, wherein the skirt includes a base coupling the outer wall to the post of the mounting shank, the outer wall of the skirt defining a first longitudinal axis and the post defining a second longitudinal axis, the first axis being offset from the second axis, and an opening formed within the base to receive tubes.

14. A faucet mounting system comprising:
an upper fixture including a cylindrical outer wall having an upper end and a lower end, an inner surface defining a chamber extending between the upper end and the lower end, and at least one annular groove formed within the inner surface proximate the lower end; and
a lower mounting shank extending below the upper fixture, the lower mounting shank including a skirt having a skirt wall, a post extending downwardly from the skirt, at least one spring clip received within the at least one annular groove for axially securing the mounting shank to the upper fixture, wherein the at least one spring clip includes a pair of opposing retaining members proximate ends thereof, the skirt includes a fulcrum positioned intermediate the retaining members, and the skirt wall includes a slot to receive the retaining members, the outer wall of the skirt defining a first longitudinal axis, and the post defining a second longitudinal axis, the first longitudinal axis being offset from the second longitudinal axis.

15. The faucet mounting system of claim 14, further comprising a key supported by one of the upper fixture and the lower mounting shank, and a keyway supported by the other of the lower mounting shank and the upper fixture, the key received within the keyway to rotationally orient the upper fixture relative to the lower mounting shank.

16. The faucet mounting system of claim 14, wherein the upper fixture comprises a faucet spout hub.

17. The faucet mounting system of claim 14, wherein:
the outer wall of the upper fixture is cylindrical, and
the at least one spring clip includes a pair of diametrically opposed spring clips.

18. The faucet mounting system of claim 14, wherein the post includes external threads to receive a mounting nut.

* * * * *